United States Patent
Buchmeier et al.

(10) Patent No.: US 12,447,926 B2
(45) Date of Patent: Oct. 21, 2025

(54) DEVICE FOR ACTIVATING A VEHICLE FUNCTION

(71) Applicant: Continental Automotive Technologies GmbH, Hannover (DE)

(72) Inventors: Guilherme Germano Buchmeier, Toulouse (FR); Brahim Aloui, Toulouse (FR); Grégory Siguier, Toulouse (FR)

(73) Assignee: CONTINENTAL AUTOMOTIVE TECHNOLOGIES GMBH, Hannover (DE)

( * ) Notice: Subject to any disclaimer, the term of this patent is extended or adjusted under 35 U.S.C. 154(b) by 163 days.

(21) Appl. No.: 18/523,063

(22) Filed: Nov. 29, 2023

(65) Prior Publication Data
US 2024/0198959 A1  Jun. 20, 2024

(30) Foreign Application Priority Data

Dec. 14, 2022  (FR) ..................... 2213301

(51) Int. Cl.
*B60R 25/24* (2013.01)

(52) U.S. Cl.
CPC ........ *B60R 25/24* (2013.01); *B60R 2325/103* (2013.01)

(58) Field of Classification Search
CPC . H04B 5/70; H04B 5/43; H01Q 1/526; H01Q 1/3283; H01Q 5/25; H01Q 5/307; H01Q 1/2216; H01Q 1/3241; H01Q 7/00; H01Q 5/42; B60R 25/24; B60R 2325/103
See application file for complete search history.

(56) References Cited

U.S. PATENT DOCUMENTS

| | | | | |
|---|---|---|---|---|
| 11,741,767 B1 * | 8/2023 | Pearson | ............... | B60R 25/406 |
| | | | | 701/2 |
| 2018/0312137 A1 | 11/2018 | Neuhoff et al. | | |
| 2019/0191266 A1 * | 6/2019 | Wang | ..................... | B60K 35/60 |
| 2020/0047712 A1 * | 2/2020 | Spick | ....................... | H04B 5/26 |
| 2021/0370877 A1 * | 12/2021 | Peterson | ............... | B60R 25/246 |

FOREIGN PATENT DOCUMENTS

| | | | | |
|---|---|---|---|---|
| CN | 108075231 A | 5/2018 | | |
| EP | 3524759 A1 | 8/2019 | | |
| WO | WO-2016132654 A1 * | 8/2016 | ......... | G06K 19/0723 |
| WO | WO-2017144348 A1 * | 8/2017 | ......... | G07C 9/00309 |
| WO | 2022055277 A1 | 3/2022 | | |

OTHER PUBLICATIONS

French Search Report for French Application No. 2213301, dated Jun. 13, 2023 with translation, 11 pages.

* cited by examiner

*Primary Examiner* — Yong Hang Jiang
(74) *Attorney, Agent, or Firm* — Buchanan Ingersoll & Rooney PC

(57) ABSTRACT

A device for activating a vehicle function. The device being intended to be housed on board a vehicle and includes at least one ultra-wideband communication antenna and at least one near-field communication antenna in order to communicate with an item of portable equipment carried by a user. The function being activated based on a location of the item of equipment with respect to the vehicle and on an authentication of the item of equipment. The windings of the near-field communication antenna delimit a perimeter of a receptacle in which the ultra-wideband communication antenna is located.

8 Claims, 3 Drawing Sheets

DEVICE FOR ACTIVATING A VEHICLE FUNCTION

CROSS REFERENCE TO RELATED APPLICATIONS

This application claims priority to French Patent Application No. 2213301, filed Dec. 14, 2022, the contents of such applications being incorporated by reference herein.

FIELD OF THE INVENTION

The invention concerns the automotive field and relates to a device for activating a vehicle function, in particular, but without limitation, the "hands-free" locking and unlocking function for the opening elements of the vehicle.

BACKGROUND OF THE INVENTION

What is referred to as a "hands-free" access system for accessing a motor vehicle allows an authorized user to lock and/or unlock the opening elements of their vehicle without having to physically press buttons on a key. For this purpose, the vehicle identifies an item of portable equipment such as a badge or a remote control carried by the user and, if the badge or the remote control is located within a predetermined area around the vehicle or in the vehicle and is identified as belonging to the vehicle, then the vehicle automatically locks/unlocks its opening elements according to the user's intention, without the user having to physically handle a key.

To this end, when the user approaches the vehicle, communication is established over a generally radiofrequency wireless communication link between the item of portable equipment and an activation device on board the vehicle in order to authenticate said item of equipment by way of its identifier and to locate it with respect to the vehicle.

Nowadays, however, it is increasingly common to use a cell phone to perform authentication functions, this making it possible to avoid using a dedicated electronic badge and thus to limit the number of items of equipment. Since most cell phones do not have radiofrequency communication means, it therefore becomes necessary to adapt the "hands-free" access and/or starting system for a vehicle so that it is also able to work with a cell phone equipped with other communication standards, such as for example ultra-wideband. Ultra-wideband (UWB) is a radio modulation technique that is based on the transmission of pulses with a very short duration, often of less than one nanosecond. The bandwidth may thus reach very large values.

However, locating the item of portable equipment using ultra-wideband exhibits certain drawbacks, in this case when the item of portable equipment is discharged, that is to say when its integrated battery is empty, it is no longer able to communicate with the vehicle in ultra-wideband.

To rectify this problem, it is known to integrate an NFC (near-field communication) reader into the door. This NFC reader operates at a frequency of 13.56 MHZ and has the advantage of being able to communicate with the item of portable equipment when it is discharged.

Indeed, since the NFC reader is electrically connected to the battery of the vehicle, it is able to charge the battery of the item of portable equipment through electromagnetic induction for the time necessary for example to authenticate the latter and lock/unlock the vehicle.

It is therefore common to integrate an NFC antenna next to the ultra-wideband antenna in the door of the vehicle, for example in the handle.

The NFC antenna A2, which consists of windings of copper wires, is generally located at one end of the activation device D that is contained for example in a door handle P of the vehicle V (cf. FIG. 1), while the ultra-wideband antenna takes up a substantial amount of space in the handle. It is known to integrate two ultra-wideband antennas A1, A1', arranged in the device D on either side of the center of the device, in order to obtain complementary radiation patterns covering a wide area around the vehicle sufficient to communicate with the item of portable equipment. Indeed, the device is generally surrounded by a housing B that takes up all of the space allocated in the handle P.

However, the integration of the additional NFC antenna A2 reduces the space allocated to the integrated electronic circuit 10 in the device D, along with the space allocated to the two ultra-wideband antennas A1, A1', as illustrated in FIG. 2.

In addition, the position of the NFC reader at a precise location on the handle forces the user to bring their item of portable equipment close to this precise location so that said item of equipment is able to communicate with the reader, which is not ideal in terms of ergonomics.

An aspect of the invention proposes a device for activating a vehicle function that overcomes the drawbacks of the prior art, in this case a device that makes it possible to allocate more space to the electronics embedded in the handle and that also allows a larger area for communication on the handle between the item of portable equipment and the NFC reader.

SUMMARY OF THE INVENTION

An aspect of the invention relates to a device for activating a vehicle function, the device being intended to be housed on board a vehicle and comprising at least one ultra-wideband communication antenna and at least one near-field communication antenna in order to communicate with an item of portable equipment carried by a user, the function being activated based on a location of said item of equipment with respect to the vehicle and on an authentication of the item of equipment, the device being noteworthy in that windings of the near-field communication antenna delimit a perimeter of a receptacle in which the ultra-wideband communication antenna is located.

In one preferred embodiment of the invention, the device comprises two near-field communication antennas each surrounding an ultra-wideband communication antenna.

Expediently, the ultra-wideband communication antennas are arranged on either side of a center of the activation device.

Advantageously, the near-field communication antenna and the ultra-wideband communication antenna are connected to a printed circuit and ground planes of said circuit are located on either side of the receptacle.

An aspect of the invention also relates to any door handle for a vehicle, any vehicle door, any door pillar and finally any vehicle comprising an activation device according to any one of the features listed above.

BRIEF DESCRIPTION OF THE DRAWINGS

Further features and advantages of aspects of the invention will become more clearly apparent upon reading the following description. This description is purely illustrative and should be read in conjunction with the appended drawings, in which.

DETAILED DESCRIPTION OF THE PREFERRED EMBODIMENTS

As explained above, the activation device D from the prior art with the near-field communication antenna A2 offset on one side of the device D considerably reduces the space allocated to the ultra-wideband communication antennas A1, A1' and the space allocated to the printed circuit 10.

An aspect of the invention therefore proposes an activation device D' in which the NFC antenna B2 is located at the same location as a ULB antenna B1, and no longer offset on one side.

Figure 1:
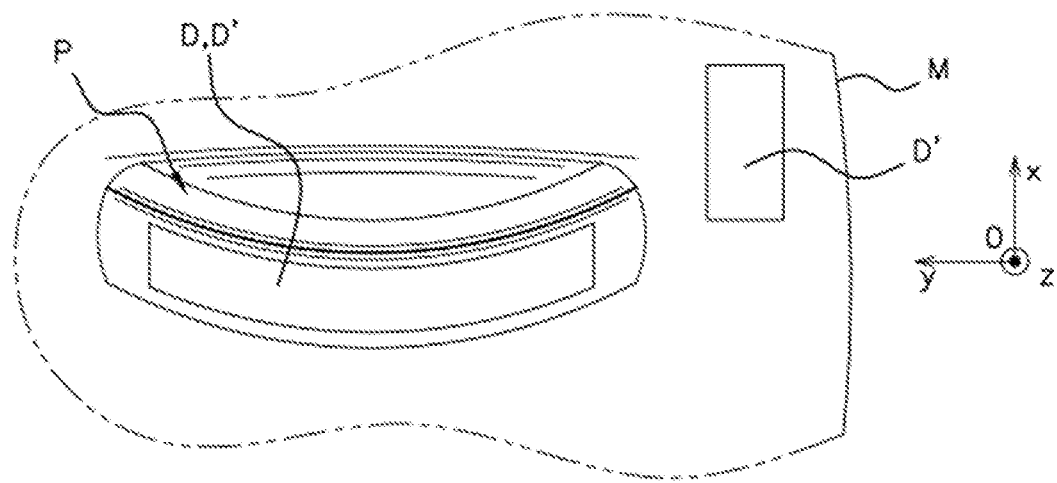
FIG. 1 is a diagram showing a motor vehicle door handle comprising an activation device according to an aspect of the invention.
Figure 2:
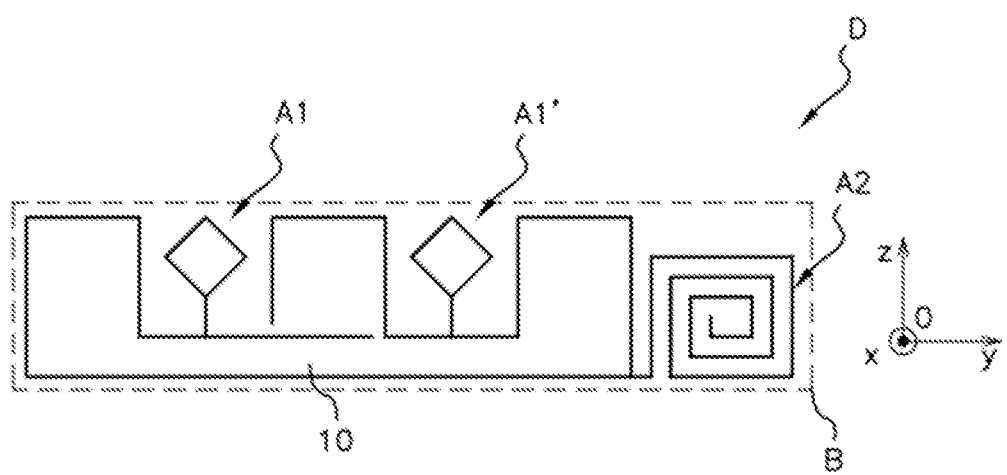
FIG. 2 is a sectional view showing a housing comprising an activation device according to the prior art.
Figure 3:
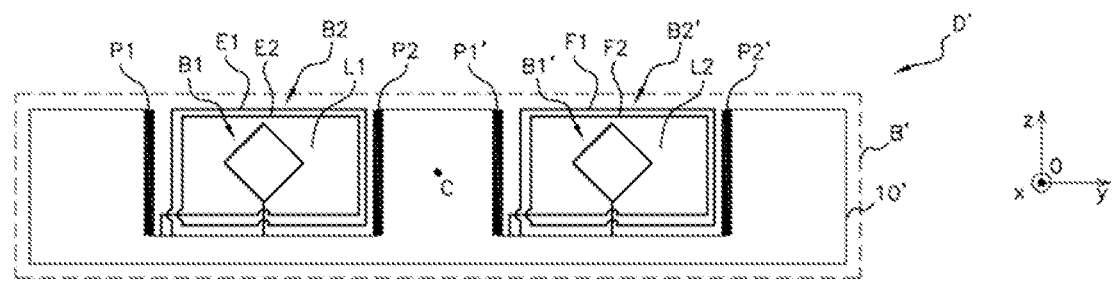
FIG. 3 is a sectional view showing a housing comprising an activation device according to an aspect of the invention.

More specifically, according to an aspect of the invention, windings E1, E2 of the NFC antenna B2 define a receptacle L1 in the device D' in which the ULB antenna B1 is located (cf. FIG. 3).

FIG. 3 shows a sectional view of the activation device D' of an aspect of the invention in the plane ZY of the orthonormal reference frame (O, x, y, z), also illustrated in FIG. 3.

The device D' is contained within a generally sealed housing B', and said device comprises a printed circuit 10' equipped with electronic components, as well as at least one ultra-wideband communication antenna B1, B1' and at least one near-field communication antenna B2, B2'.

The device D' may be integrated into a vehicle V door handle P, but also into the door itself, or into a door pillar M or into any bodywork element located next to an opening element of the vehicle, for example next to a rear trunk.

In the example illustrated in FIG. 3, the device D' comprises, without limitation per se, two ULB antennas B1, B1' and two NFC antennas B2, B2'.

Indeed, the applicant observed that two ULB antennas B1, B1' made it possible to obtain two radiation patterns that are complementary and that improve the detection of the item of portable equipment P within a predetermined area around the vehicle V.

Said NFC antennas B2, B2' and said ULB antennas B1, B1' are connected to the printed circuit 10', which comprises the means for controlling said antennas, that is to say the means for transmitting/receiving and the means for processing the data that are sent and received by said antennas, this being known to a person skilled in the art.

In the example illustrated in FIG. 3, the ultra-wideband communication antennas B1, B1' are located on either side of a center C of the device D'.

This center C is located in the middle of the printed circuit 10' along the longitudinal axis Y.

Said ULB antennas B1, B1', in a manner known per se, are in the form of a copper surface, here, illustratively, in the shape of a diamond.

According to an aspect of the invention, the windings E1, E2 of an NFC antenna B2 delimit a perimeter that defines a receptacle L1 in which a ULB antenna B1 is located.

This may be seen in FIG. 3, the windings E1, E2 of the NFC antenna B2, in the sectional view, being in a rectangular shape and defining the contours of a rectangular receptacle L1 surrounding the ULB antenna B1. Similarly, the windings F1, F2 of the NFC antenna B2' delimit a rectangular receptacle L2 surrounding the ULB antenna B1'.

Figure 4:
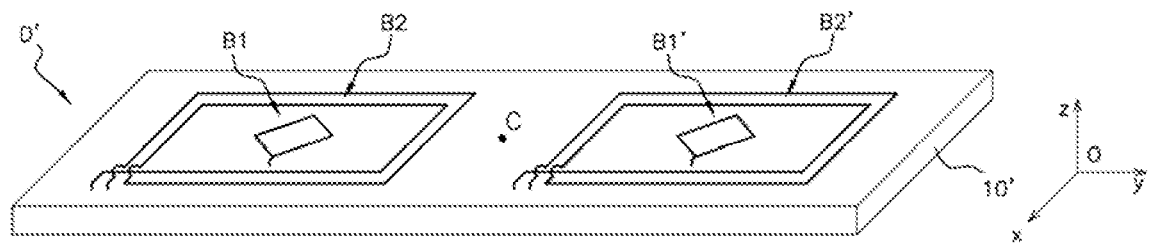
FIG. 4 is a perspective view showing the activation device according to an aspect of the invention.

In the 3D dimension, the windings E1, E2 extend along the transverse axis X (cf. FIG. 4).

In the example of FIG. 3, the windings E1, E2 of the NFC antenna B2 are rectangular in shape, but they may also be round, square or oval in shape.

Likewise, the shape of the ULB antennas B1, B1' in the shape of a diamond is in no way limiting.

Ground planes P1, P2, P1', P2' of the printed circuit 10' are located on each side of the receptacle L1, along the vertical axis Z.

Said ground planes avoid any electromagnetic disturbance between said NFC antennas B2, B2' and the ULB antennas B1, B1' with the electronic components of the printed circuit 10'.

The applicant observed that the presence of the ULB antennas B1, B1' near the NFC antennas B2, B2' impacted the performance of the NFC antennas B2, B2', but that this impact was negligible.

Figure 5:
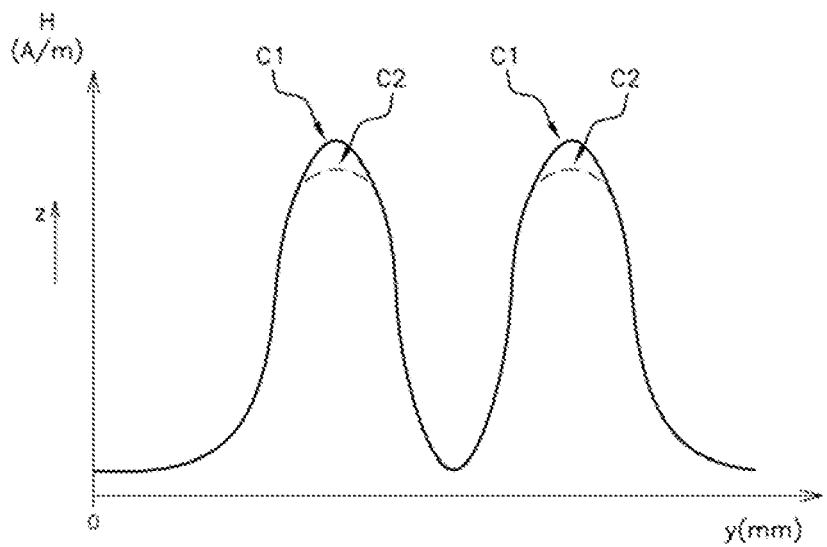
FIG. 5 is a graph showing an intensity of the electromagnetic field of the near-field communication antennas in the plane XY, with and without the ultra-wideband communication antennas, FIG. 6 comprises five radiation patterns of the ultra-wideband communication antennas, in the reference frame of FIG. 4, at various frequencies with and without the near-field communication antennas.

This is illustrated in FIG. 5. The graph of FIG. 5 represents the electromagnetic field (in ampere/meter) along the longitudinal axis Y of the device D' generated by the two NFC antennas B1, B1' in two configurations:
  a. A first configuration C1 in which the device D' does not comprise any ULB antennas B1, B1',
  b. A second configuration C2, in which the device D' comprises two ULB antennas B1, B1', each being arranged according to an aspect of the invention, that is to say surrounded by an NFC antenna B2, B2'.

It becomes apparent from reading the graph of FIG. 5 that the field generated by the two NFC antennas B2, B2' propagates less far along the axis Z with the second configuration C2 than with the first configuration C1.

In other words, the detection range along the axis Z of the NFC antennas B2, B2' is reduced by the presence of the ULB antennas B1, B1', which disturb them.

However, it was observed by the applicant that this electromagnetic disturbance results in a loss of size of the detection zone of only a few millimeters and may be neglected.

On the other hand, the applicant observed that the presence of the NFC antennas B2, B2' around the ULB antennas B1, B1' improved the homogeneity of the electromagnetic field produced by said ULB antennas B1, B1'.

Figure 6:
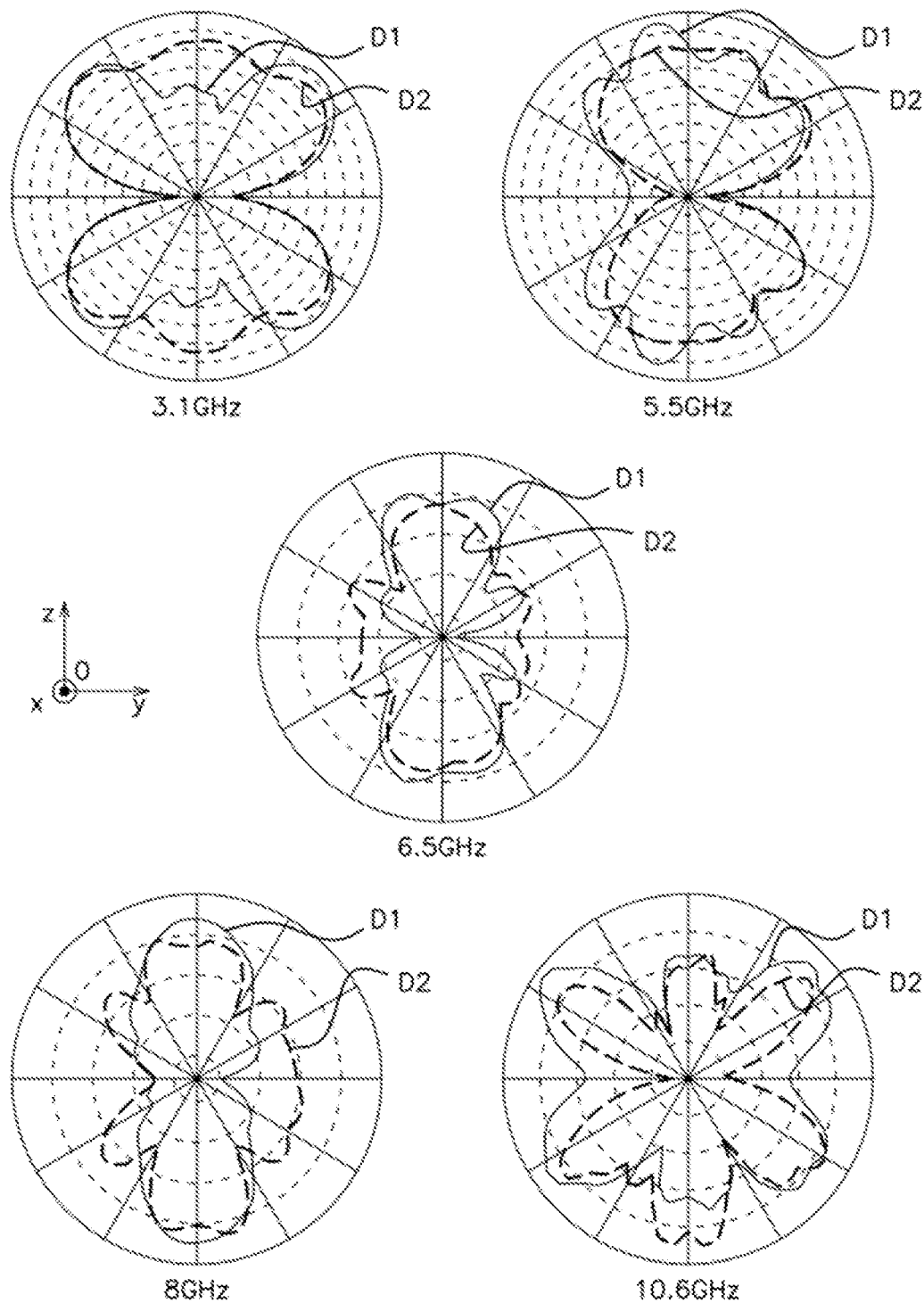

This is illustrated in FIG. 6. FIG. 6 shows five radiation patterns with various emission frequencies of 3.1 GHZ, 5.5 GHZ, 6.5 GHZ, 8 GHZ and 10.6 GHz of a ULB antenna B1, in two configurations:
  a. A first configuration D1 without the presence of an NFC antenna B2 arranged according to an aspect of the invention, that is to say surrounding the ULB antenna B1, b. A second configuration D2, in which an NFC antenna B2 surrounds the ULB antenna B1, according to an aspect of the invention.

It becomes apparent from reading the five radiation patterns that, for frequencies equal to 3.1 GHZ, 6.5 GHZ and 8 GHZ, the radiation pattern of the ULB antenna B1 in the second configuration D2 is more homogeneous in the two directions Z and Y than the radiation pattern of said antenna in the first configuration D1.

For the frequency of 5.5 GHZ, the radiation patterns in the two configurations are very close, and there is almost no difference.

Only at the very high frequency of 10.6 GHz is the trend reversed, and the radiation pattern in the second configuration D2 is less homogeneous than the radiation pattern in the first configuration D1.

It thus became apparent to the applicant, and contrary to the prejudices of a person skilled in the art, that the proximity of the two types of antennas, NFC B2, B2' and ULB B1, B1', did not notably worsen the performance of the two types of antennas and, on the contrary, greatly improved the performance of the ULB antennas B1, B1' for certain frequencies.

Thus, by arranging the NFC antennas B2, B2' around the ULB antennas B1, B1' and no longer offset at one end of the device D', the space allocated for the printed circuit 10' and for the ULB antennas B1, B1' is larger than that which was present in the device from the prior art.

Moreover, with the activation device D' according to an aspect of the invention, the ultra-wideband communication and/or detection area around the vehicle V is more homogeneous, this being a non-negligible advantage.

An aspect of the invention is particularly ingenious because it goes against the prejudices of a person skilled in the art, who would not have arranged two antennas of different types (NFC and ULB) close to one another because they would fear electromagnetic disturbances.

The invention claimed is:

1. A device for activating a vehicle function, the device being intended to be housed on board a vehicle and comprising at least one ultra-wideband communication antenna and at least one near-field communication antenna, comprising windings, in order to communicate with an item of portable equipment carried by a user, the vehicle function being activated based on a location of said item of equipment with respect to the vehicle and on an authentication of the item of equipment, the windings of the near-field communication antenna delimit a perimeter of a receptacle in which the ultra-wideband communication antenna is located.

2. The activation device as claimed in claim 1, further comprising two near-field communication antennas each surrounding an ultra-wideband communication antenna.

3. The activation device as claimed in claim 2, wherein the ultra-wideband communication antennas are arranged on either side of a center of the activation device.

4. The activation device as claimed in claim 1, wherein the near-field communication antenna and the ultra-wideband communication antenna are connected to a printed circuit and ground planes of said circuit are located on either side of the receptacle.

5. A door handle for a vehicle, comprising an activation device as claimed in claim 1.

6. A vehicle door, comprising an activation device as claimed in claim 1.

7. A door pillar, comprising an activation device as claimed in claim 1.

8. A motor vehicle, comprising an activation device as claimed in claim 1.

* * * * *